United States Patent [19]
Belcher

[11] Patent Number: 5,639,128
[45] Date of Patent: Jun. 17, 1997

[54] METHOD OF AND APPARATUS FOR SECURING A MULTI-LAYERED FLEXIBLE FLOWLINE TO AN END FITTING

[75] Inventor: John R. Belcher, Panama City Beach, Fla.

[73] Assignee: Wellstream, Inc., Panama City, Fla.

[21] Appl. No.: 493,086

[22] Filed: Jun. 21, 1995

[51] Int. Cl.$^6$ ............................................. F16L 39/02
[52] U.S. Cl. ........................................... 285/149; 285/255
[58] Field of Search .................................. 285/149, 238, 285/239, 255, 259

[56] References Cited

U.S. PATENT DOCUMENTS

| | | | |
|---|---|---|---|
| 2,076,632 | 4/1937 | Goodall | 285/149 |
| 2,234,350 | 3/1941 | Muller | 285/149 |
| 2,394,632 | 2/1946 | Parker | 285/149 |
| 3,112,937 | 12/1963 | William | 285/149 |
| 3,148,898 | 9/1964 | Somen | 285/149 |
| 4,773,452 | 9/1988 | Dotti et al. | 285/149 |
| 4,950,001 | 8/1990 | Briggs | 285/149 |

FOREIGN PATENT DOCUMENTS 734830  5/1966  Canada .............................. 285/149

Primary Examiner—Eric K. Nicholson
Attorney, Agent, or Firm—Browning Bushman

[57] ABSTRACT

A tubular sleeve has a first end inserted between concentric inner and outer layers of a flexible flowline. The tubular sleeve is welded to the inner sleeve. The tubular sleeve has serrated outer surfaces for cutting into the outer layer of the flexible flowline, or alternatively, has saw tooth edges at its one end for cutting into the outer layer of the flexible flowline. The outer end of the tubular sleeve is fixedly attached to the interior of a cup-shaped end piece, either by a snap coupling or by a threaded connection.

15 Claims, 1 Drawing Sheet

METHOD OF AND APPARATUS FOR SECURING A MULTI-LAYERED FLEXIBLE FLOWLINE TO AN END FITTING

FIELD OF THE INVENTION

The present invention relates to a method of and apparatus for securing a multi-layered flexible flowline to an end fitting.

BACKGROUND OF THE INVENTION

A typical flexible flowline consists of several distinct concentric layers which give strength and flexibility to the flowline. The innermost layer, known as the carcass, prevents collapse of the flowline due to external hydrostatic pressure. The next layer, known as the barrier, is made from a synthetic polymer material and serves to prevent leakage of the contents from the flowline. There may then be a succession of other layers of varying materials.

A flexible flowline may be used, for example, as a dynamic riser to couple a rigid flowline or another flexible flowline on the seabed to a floating vessel or buoy to convey production fluids such as oil, gas or oil/gas mixtures under pressure from an oil gas well or platform to the vessel or buoy. Hence, an end fitting is required to couple the flexible flowline at each end to the adjacent flowline or wellhead and the vessel or buoy.

A leak-tight seal in the end fitting has sometimes been obtained in the prior art with an inner seal ring which engages with the external surface of the barrier. This seal ring also holds the barrier and carcass in position in the end fitting by the frictional force generated by the pressure of the seal ring on the barrier layer.

However, problems may arise with this conventional type of end fitting where the flowline and end fitting are subjected to periodic heating and cooling. Periodic heating and cooling occurs when the flowline and end fitting are subjected to repeated changes in temperature. For example, the flowline may be exposed to temperatures in excess of 100° C. when production fluid is conveyed through the flowline and subsequently may be exposed to temperatures dose to 0° C. from seawater when flow of the production fluid ceases.

Repeated thermal cycling can result in failure of the carcass and barrier to maintain their original shape. During heating, loss of plasticizer may occur in the barrier which may cause shrinkage of the barrier. During cooling, the barrier tends to shrink axially due to thermal contraction.

Due to shrinkage of the barrier, the inner seal ring may no longer exert enough pressure to hold the barrier and the carcass to the end fitting. As a result, the barrier and the carcass may slip out of the inner seal ring, thus causing leakage and failure of the connection between the end fitting and the flowline.

SUMMARY OF THE INVENTION

In accordance with one aspect of the present invention, a method of securing a multi-layered flexible flowline to an end fitting comprises the steps of inserting an end of the flowline into the end fitting and fixedly coupling the carcass to the end fitting.

In accordance with a second aspect of the present invention, the apparatus for securing a multi-layered flexible flowline to an end fitting comprises a tubular member adapted to be fixed to the carcass adjacent an end of the carcass of the flowline, the tubular member having a coupling formation, and an end fitting adapted to receive the end of the carcass and the tubular member, and the end fitting having a complementary coupling formation which engages with the coupling formation on the tubular member to secure the carcass to the end fitting.

The invention has the advantage of fixedly coupling the carcass of a multi-layered flowline to an end fitting, and does not rely on the pressure between an inner seal ring and the external surface of the barrier to hold the carcass and barrier in the end fitting.

In the context of this application, the term "carcass" is used to denote the innermost structural layer of a multi-layered flexible flowline. Typically, the tubular member is made from a metal material, and may be fixed to the carcass by welding.

Preferably, the tubular member is adapted to facilitate welding of the member to the carcass. For example, this may be achieved by providing suitable holes around the circumference of the tubular member or alternatively by providing suitable holes in the carcass.

Typically, the tubular member is in the form of a sleeve which is inserted between the carcass and the layer of the flowline adjacent to the carcass. This may be the barrier layer.

The sleeve may have saw teeth around its bottom edge, so that as it is inserted and rotated, it acts as a hole-cutter, cutting into the adjacent layer.

Preferably, the outer surface of the sleeve has serrations adapted to engage with the adjacent layer after insertion, allowing the sleeve to retain the adjacent layer more securely.

Typically, the top end of the sleeve may have a snap connector fitting and/or be threaded to permit screw connection to the end fitting. Alternatively, or in addition, it may be provided with any other suitable releasable or non-releasable connector means.

Typically, the method and apparatus of the present invention may be used in a context where the flowline and end fitting are subjected to high pressure liquids or gasses, for example, where the flowline conducts the flow of production fluids, such as oil and/or gas from a borehole on the seabed.

An example of a method of and apparatus for securing a multi-layered flexible flowline to an end fitting in accordance with the invention will now be described with reference to the accompanying drawings.

BRIEF DESCRIPTION OF THE PREFERRED EMBODIMENTS

Figure 1:
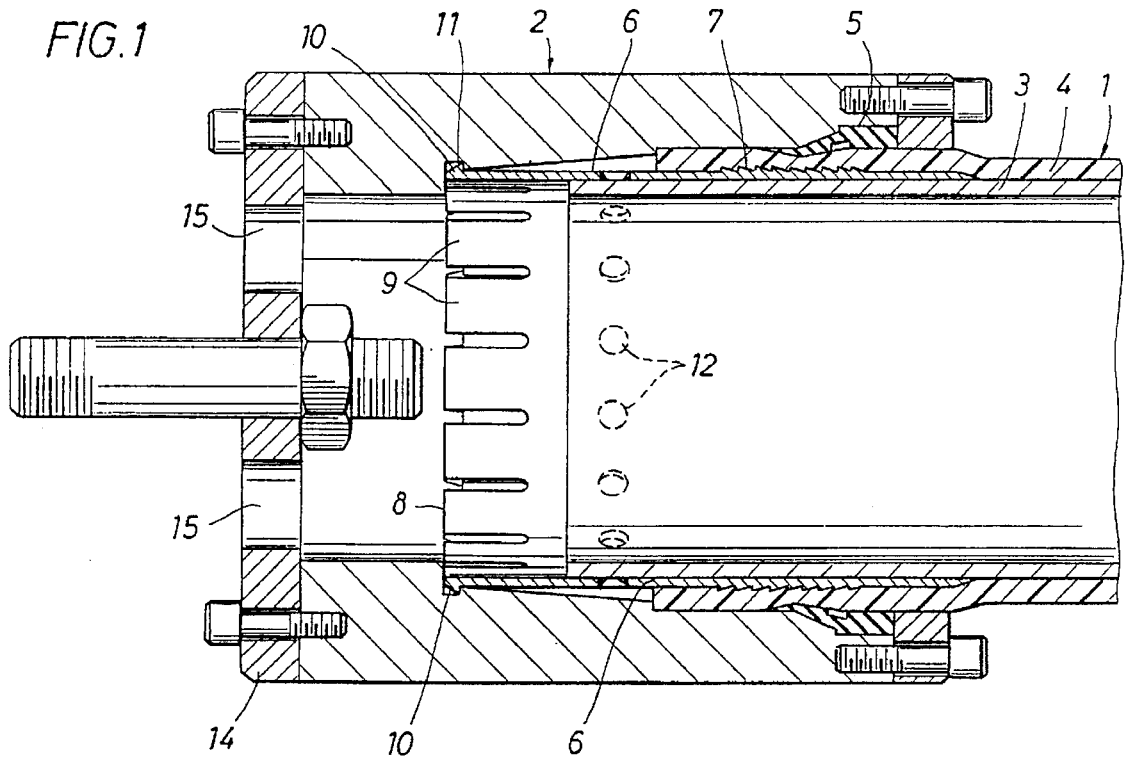
FIG. 1 is an elevated view, partly in cross-section, depicting a flexible flowline connected to an end fitting and secured with apparatus in accordance with the present invention.

FIG. 1 shows a flexible flowline 1 secured to an end fitting 2. For clarity, only the carcass 3 and the barrier 4 layers of the flowline are shown.

A conventional inner seal ring 5 presses against the external surface of the barrier 4.

A sleeve 6 is inserted between the carcass 3 and the barrier 4, the sleeve 6 having serrations 7 on its external surface, and a snap connector fitting 8 located at its top end. The snap connector 8 has a plurality of prongs 9, each having a lip 10 adapted to fit into a corresponding recess 11 in the end fitting 2. The end plate 14 of the end fitting 2 has one or more fluid ports 15 to allow the oil, gas or other transported material to pass therethrough. When it is desired to hydrostatic test a length of flexible flowline, an end fitting as illustrated in FIG. 1 can be put on both ends of the flowline, but having no ports 15 therein. Those skilled in this art will recognize that the one or more of the ports 15 can be made full gauge, i.e., to match the interior diameter of the flexible flowline to avoid any decrease in the flowpath for the oil, gas or any other material being transported. With the sleeve 6 inserted between the carcass 3 and the barrier 4, the serrations 7 hold the barrier in place when the sleeve 6 is engaged with the end fitting 2. The geometry of the snap connector 8 and recess 11 are chosen so that disengagement of the sleeve 6 from the end fitting 2 is prevented when tensile loads are applied to the sleeve 6.

The sleeve is also provided with a plurality of holes 12 to facilitate welding, by which the sleeve 6 is secured to the carcass 3, assuming the carcass has a metallic material therein suitable for welding. Alternatively, the holes 12 may be replaced by slots.

With the sleeve 6 in place, as shown, the flowline 1 is firmly secured to the end fitting 2, as the sleeve 6 cannot removed from the end fitting 2 without depressing the prongs 9 to release the lips 10 from the recess 11 in the end fitting 2.

Figure 2:
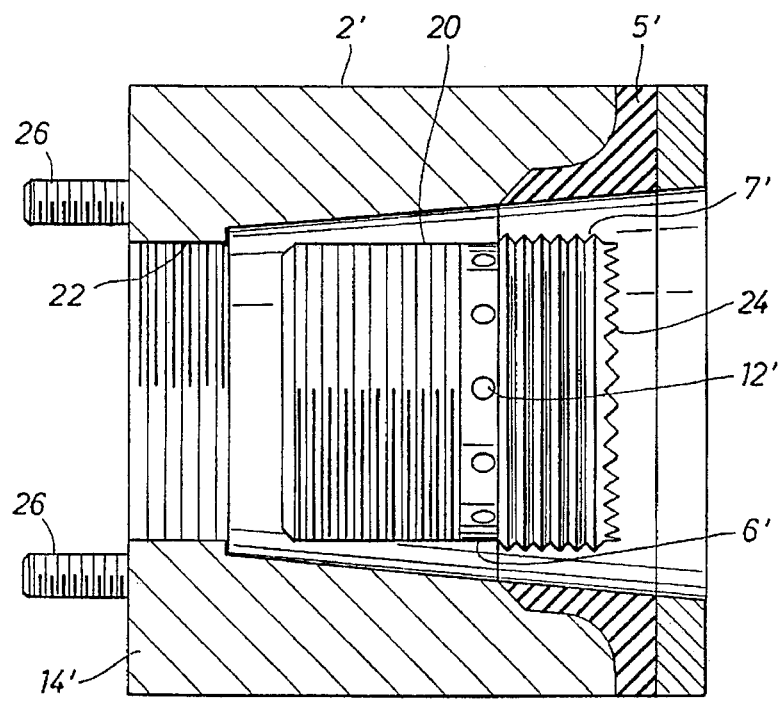
FIG. 2 is an elevated view, partly in cross-section, of an alternative form of the apparatus according to the present invention.

As an alternative to the arrangement shown in FIG. 1, the sleeve 6 may be provided with a male threaded portion 20, illustrated in FIG. 2, which replaces the prongs 9 and engages with a corresponding female threaded portion 22 on the end plate of the end fitting 2' to secure the carcass 3 to the end fitting 2'. Further, as illustrated in FIG. 2, the sleeve 6' may have saw teeth 24 on its second end (away from the end piece 2') for curing or gouging into the adjacent layer or layers (not illustrated in FIG. 2). The end piece 2', in addition to having the female threaded opening 22, has a plurality of bolts 26 for connecting the end piece 2' into the ancillary equipment, such as a floating vessel or buoy as discussed herein above, not illustrated.

In using the embodiment of FIG. 2, a flexible flowline having at least the inner layer (the carcass) and an outer layer (the barrier) and possibly other layers, is attached over the sleeve 6', with the sleeve 6' fitting between those layers as illustrated in FIG. 1. The outer layer is trimmed back to provide access through the ports 12' if welding of the carcass to the sleeve 6' is desired. The sleeve 6' is illustrated as having both the serrated surface 7 and the saw teeth 24, but one or the other, or both may be used if desired. A conventional inner seal ring 5' presses against the outer (barrier) layer.

After the flexible flowline is attached to the sleeve 6', the male threaded portion 20 of the sleeve 6' is threaded into the female threaded portion 22 of the end piece 2' to thereby complete the assembly. Depending upon whether one desires fluid to pass through the sleeve 6', out through the end plate 14', or alternatively, to hydrostatic test the length of flexible flowline, the threaded portion 20 may or may not be plugged.

Modifications and improvements may be incorporated without departing from the scope of the invention. For example, whereas the flexible flowline of FIG. 1 is illustrated and described herein as having an inner layer (carcass) and an outer layer (barrier), those skilled in this art are fully aware that flexible flowlines often times are made up of more than two concentric layers, and the claims are intended to cover the use of the end fittings in accord with the present invention with such multiple layer flowlines.

What is claimed is:

1. An end fitting for connection to one end of a flexible flowline having an inner layer and an outer layer, comprising:

a cup-shaped end piece having an end wall and a sidewall with exterior and interior surfaces;

a tubular sleeve having a bottom edge and having an external dimension sized to fit within the interior surfaces of the sidewall of said end piece, said sleeve being fixedly attachable between the inner and outer layers of a flexible flowline, and being fixedly attached to said cup-shaped end piece; and said tubular sleeve having saw teeth around its bottom edge, being designed to cut into one or both of the inner and outer layers of a flexible flowline.

2. A method of attaching an end fitting to one end of a flexible flowline having concentric inner and outer layers, comprising:

inserting a first end of a tubular sleeve between said inner and outer layers of said flexible flowline;

attaching a second end of said tubular sleeve to the interior of a cup-shaped end piece; and welding said tubular sleeve to the inner layer of said flexible flowline.

3. An end fitting connector for securing to one end of a multi-layer flexible flowline, comprising:

an axially extending tubular end fitting having first and second axial ends;

a connector end at said first axial end of said fitting;

a flowline receiving end at said second axial end of said fitting;

a tubular sleeve member separable from said end fitting and having a first end positioned between layers of said flowline at said flowline end; and a securing connection at a second end of said sleeve member adapted to be secured to said tubular end fitting, internally of said tubular end fitting, at an axial position wherein said flowline end is contained within said tubular end fitting between said first and second axial ends of said end fitting.

4. A connector as defined in claim 3, further including a seal ring disposed between said end fitting and said flowline for pressing a layer of said flowline toward said sleeve member.

5. A connector as defined in claim 3, wherein said tubular end fitting includes an internal fitting surface adapted to engage and secure said securing connection as said sleeve is moved axially into said tubular end fitting.

6. A connector as defined in claim 5, wherein said internal fitting surface includes a conical surface area with a smaller diameter adjacent an annular groove and said securing connection comprises a snap connector having resilient lipped prongs whereby said axial movement of said sleeve into said end fitting initially moves said prongs against said conical surface area and toward said groove to compress said prongs radially outwardly to secure to said end fitting when the lips on said prongs register with said groove whereby said sleeve is fixed axially relative to said end fitting.

7. A connector as defined in claim 5, wherein said internal fitting surface includes female threads and said securing connection includes male threads whereby rotation of said end fitting relative to said sleeve fixes said sleeve to said fitting.

8. A connector as defined in claim 5, further including a seal ring disposed between said end fitting and said flowline for pressing a layer of said flowline toward said sleeve member.

9. A connector as defined in claim 6, further including a seal ring disposed between said end fitting and said flowline for pressing a layer of said flowline toward said sleeve member.

10. A connector as defined in claim 7, further including a seal ring disposed between said end fitting and said flowline for pressing a layer of said flowline toward said sleeve member; and saw teeth formed along said first sleeve end.

11. A connector as defined in claim 3, further including welding access openings for welding said sleeve member to one of said flowline layers.

12. A connector as defined in claim 11, wherein said sleeve member is welded to one of said flowline layers.

13. A connector as defined in claim 3, wherein said sleeve includes serrations on its surface to form holding engagement with a flowline layer in contact with said sleeve.

14. A connector as defined in claim 8, wherein said sleeve includes serrations on its surface to form holding engagement with a flowline layer in contact with said sleeve.

15. A method of attaching an end fitting over one end of a flexible flowline, said flowline having concentric inner and outer layers, comprising the steps of:

inserting a first end of a tubular sleeve between said inner and outer layers of said flexible flowline;

inserting a second end of said sleeve and a portion of said flowline into said end fitting;

securing said second end of said sleeve to said end fitting;

applying a seal ring between said end fitting and said sleeve for pressing a layer of said flow line toward said sleeve; and welding said sleeve to a layer of said flow line.

* * * * *